United States Patent [19]
Krause

[11] 3,888,020
[45] June 10, 1975

[54] MANIKIN SYNCHRONIZATION SYSTEM

[75] Inventor: Irving A. Krause, Nutley, N.J.

[73] Assignee: International Telephone and Telegraph Corporation, Nutley, N.J.

[22] Filed: Sept. 18, 1973

[21] Appl. No.: 398,357

Related U.S. Application Data

[62] Division of Ser. No. 221,902, Jan. 31, 1972, Pat. No. 3,769,526.

[52] U.S. Cl. .................................................. 35/17
[51] Int. Cl. ............................................ G09b 23/32
[58] Field of Search ........................................ 35/17

[56] References Cited
UNITED STATES PATENTS

| | | | |
|---|---|---|---|
| 2,463,685 | 3/1949 | Fredendall | 331/20 |
| 2,848,617 | 8/1958 | Horowitz | 331/20 |
| 2,868,975 | 1/1959 | Harris | 331/20 X |
| 2,912,651 | 11/1959 | Leeds | 331/20 X |
| 3,156,874 | 11/1964 | Verdibello | 307/228 X |
| 3,375,462 | 3/1968 | McTaggart | 331/20 X |
| 3,520,071 | 7/1970 | Abrahamson | 35/17 |
| 3,564,729 | 2/1971 | Ackerman | 35/17 |
| 3,665,087 | 5/1972 | Poylo | 35/17 |

*Primary Examiner*—Harland S. Skogquist
*Attorney, Agent, or Firm*—John T. O'Halloran; Menotti J. Lombardi

[57] ABSTRACT

A manikin synchronization system is described to cause recorded aural sounds to be coincident with mechanical motions including the effects of the breathing cycles. The synchronization system interfaces with the mechanical and audio systems in order to bring heart sounds, breathing cycles and mechanical motions into time coincidence. The synchronizing system accepts pulses from a mechanical master timing shaft which indicates the mid-points of the breathing cycles. These pulses are applied to the synchronization system which, in response to additional synchronization information on an audio tape, indicates whether the audio signal is early or late with respect to the mechanical system. Accordingly, a voltage controlled oscillator produces an output proportional to the indication to control the tape drive and create synchronization of the audio and mechanical systems.

2 Claims, 3 Drawing Figures

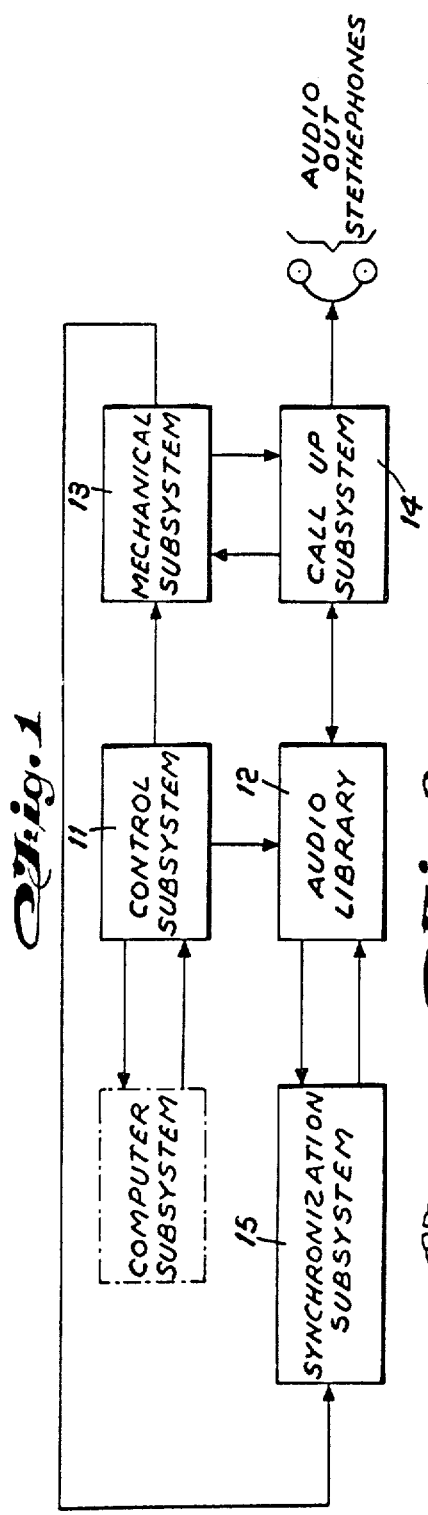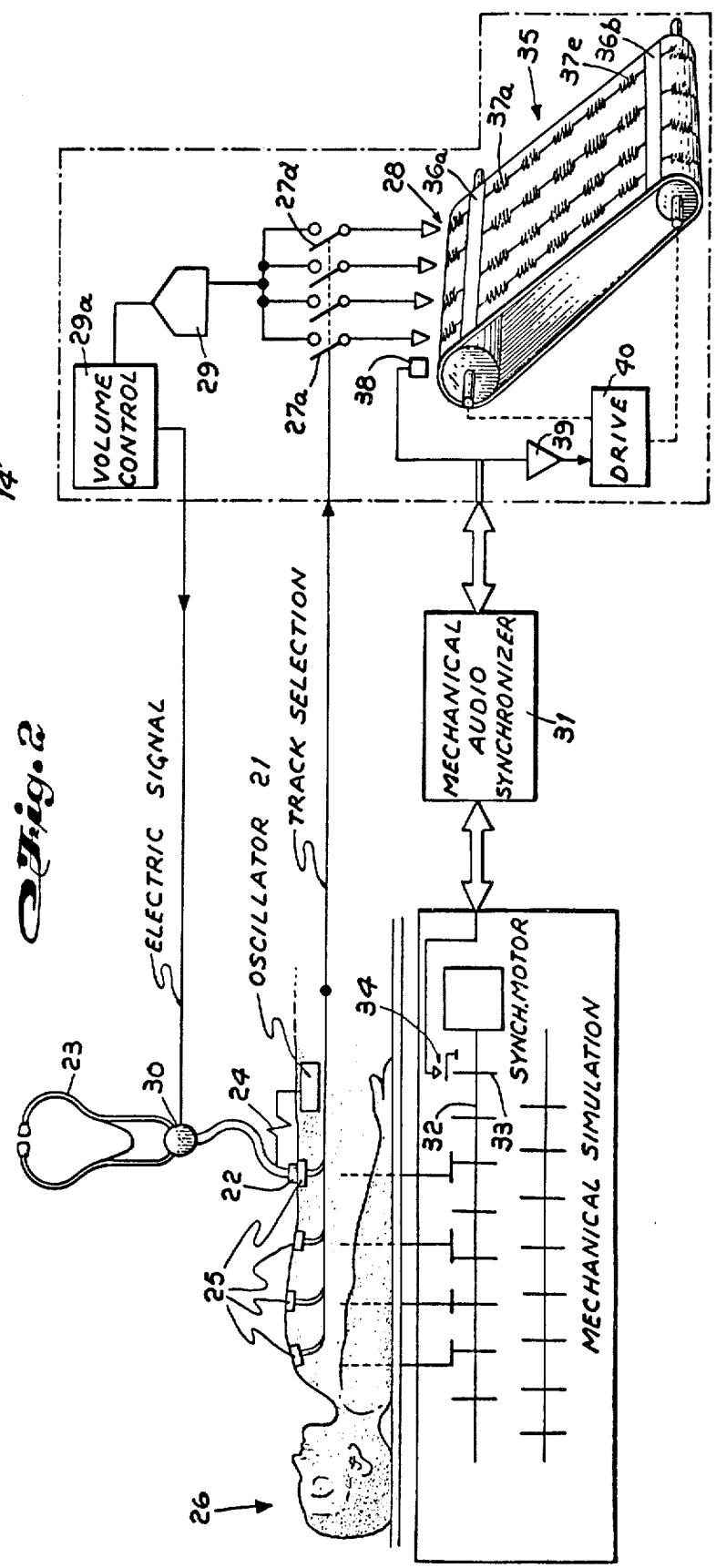

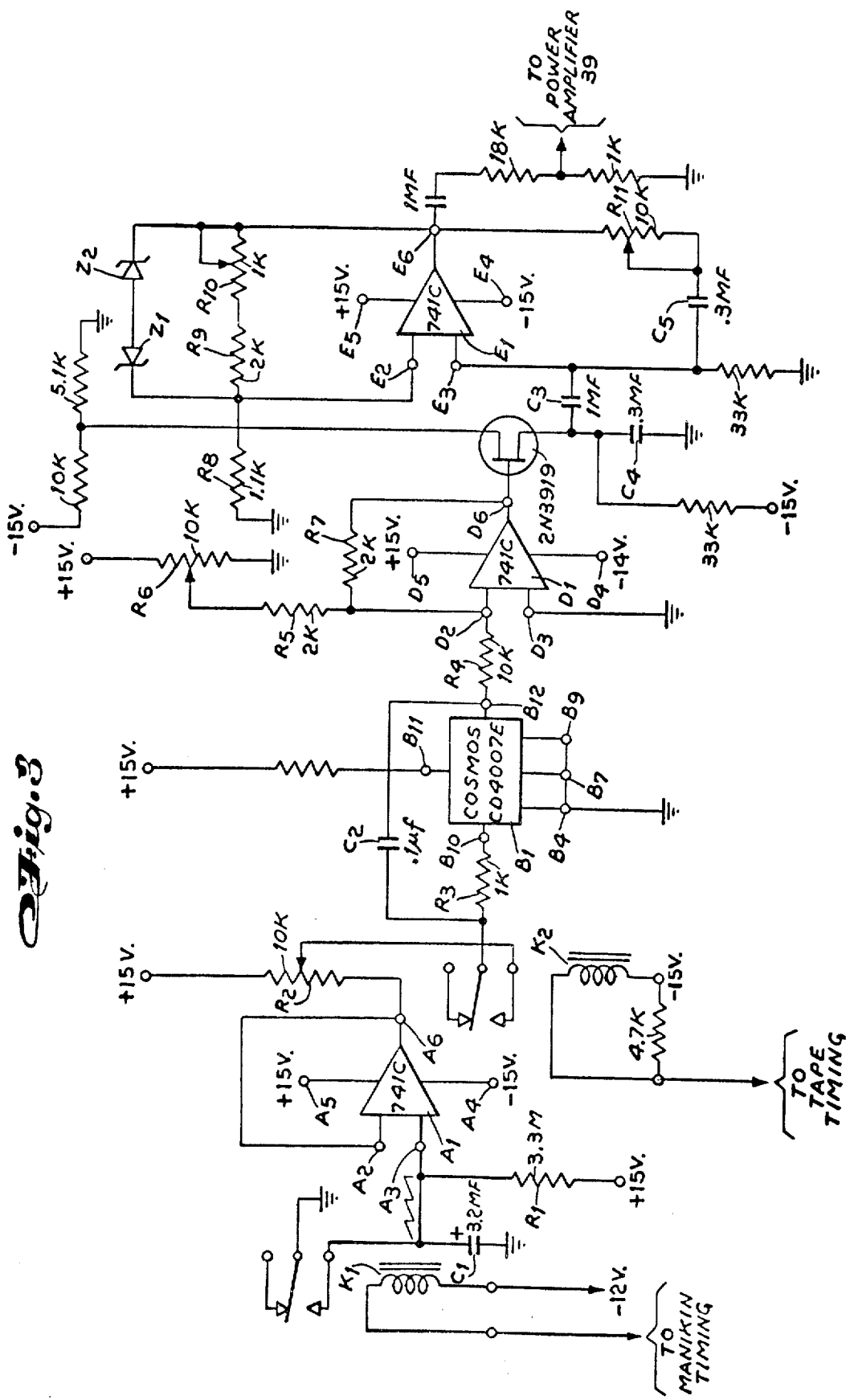

MANIKIN SYNCHRONIZATION SYSTEM

This is a division of application Ser. No. 221,902, filed Jan. 31, 1972, and now U.S. Pat. No. 3,769,526.

CROSS REFERENCE TO RELATED APPLICATION

This application is related to Application Ser. No. 92,788, filed November 25, 1970, now U.S. Pat. No. 3,665,087 and entitled A manikin Audio System. The assignee of this referenced application is the same as in the present application.

BACKGROUND OF THE INVENTION

In general, this invention relates to a manikin synchronizing system which automatically causes the aural sound to be coincident with the mechanical motions including the effects for breathing.

In order to provide a realistic teaching system for mechanical and acoustic simulation of a large number of heart ailments, the mechanical simulation of the manikin must duplicate the breathing and movements of major veins, arteries and motions in the chest areas. Heart sounds for each ailment are also simultaneously simulated by an audio library of tapes driven in synchronization with the mechanical action. As illustrated in FIG. 1, a functional block diagram of the teaching manikin is illustrated. This block diagram is composed of a number of integrated subsystems.

In this arrangement, one of a number of diseases to be simulated is selected in control system 11. The control system 11 may, of course, be adaptable to interface with a central computer. The control system activates the necessary switches in the audio library 12 and the mechanical subsystem 13. The mechanical subsystem comprises an intricate set of cams, gears, motors, solenoids and relays which provide the realistic mechanical simulation to the manikin.

The audio library consists of a sound reproducing arrangement which will produce four distinct heart sounds for each heart ailment selected. The call-up system 14 may be one of the types described in the cross referenced application, and provides the proper heart sound corresponding to the classic chest area being auscultated by the operator. Insofar as the cross referenced application is necessary for an understanding of the present invention, it is incorporated herein by the reference.

The synchronization system functions automatically to cause the aural sounds recorded to be coincident with the mechanical motions including the effects of the breathing cycle. The synchronization subsystem is the subject matter of the present invention and will further be described and explained herein.

SUMMARY OF THE INVENTION

It is therefore an object of the present invention to provide an improved synchronization system.

Another object of the invention is to provide a synchronization system for a manikin which functions automatically to cause recorder sounds to be coincident with mechanical motion.

According to the broader aspects of the invention, there is provided a synchronization system in which first means is responsive to a first timing cycle to produce a first function, second means in the system is responsive to a second timing cycle to store a sample of said first function, and third means in the system is responsive to the stored sample to produce an output proportional to the sample.

A feature of the invention is to provide a synchronization system for a manikin in which a first means is responsive to a first cycle indicating a breathing cycle to produce a first function, a second means is responsive to a second cycle indicating a cycle of heartbeats to store a sample of said first function; and in which third means is responsive to the stored sample to produce a signal proportional to said sample, whereby said heartbeat cycle is brought into synchronism with said breathing cycle.

BRIEF DESCRIPTION OF THE DRAWINGS

The foregoing objects and features of the invention will best be understood by reading the following description in connection with the drawings, in which:

FIG. 1 is a functional block diagram of a manikin incorporating the synchronization system of the invention;

FIG. 2 illustrates an embodiment of a manikin arrangement utilizing the synchronization system according to the invention; and FIG. 3 details an embodiment of a synchronization system according to the invention.

DESCRIPTION OF THE PREFERRED EMBODIMENT

Referring now to FIG. 2, a functional embodiment of the manikin arrangement incorporating the principle of the invention is illustrated. A 5 MHz oscillator 21 furnishes a signal to a metal disc 22 implanted at the end of a special type stethoscope 23 by means of a coaxial cable 24. The four classical areas of the chest 25 are fitted with conductive rubber portions located under the skin of the manikin 26. Each conductive section is connected to a recorder call-up track selection arrangement by its own coaxial cable. When the special stethoscope 23 is placed in contact with the skin over a conductive portion, a signal is capacitively induced to one of the sections 25. This signal closes an appropriate relay to make one of the contacts 27a–27d for the track selection. Associated with each contact 27 is a reading head 28 which couples the heart signal corresponding to the area auscultated to driver amplifier 29. The amplifier output passes through a volume control 29a to the transducer 31 which emits the audio sound either in the special stethoscope 23 and/or to an associated loudspeaker.

The mechanical simulation of pulsing of various veins, arteries and breathing is operated by a multiple of cams all of which are driven by a master timing synchronous motor. This arrangement facilitates the altering of the motions as required by the different heart ailments to be simulated. Motions are altered by allowing only those cams required for each ailment to be in contact with a cam follower schematically illustrated as protruding into the manikin 26. The operation of the mechanical simulation and selection is not part of this invention, and is only mentioned in connection with attaining a timing signal as hereinafter described.

The mechanical audio synchronizer 31 interfaces with the mechanical and audio library systems in order to bring the heart sounds, breathing cycle, and mechanical motions into proper time coincidence.

In order to explain how the synchronizer achieves its objectives, it is necessary to point out the basic timing cycle of this manikin arrangement. Heartbeats occur at a rate of 1 per second and a breathing cycle is completed in 5 seconds. The basic timing cycle is therefore 1 cycle in 5 seconds. By maintaining an integral number of heartbeats (5) per breathing cycle, the synchronization process is simplified. Once the breathing cycle is brought into synchronism with the mechanical and audio systems, the heart sounds and motions will also be in unison.

The synchronizer 31 accepts pulses from the mechanical master timing shaft 32 by means of timing cam 33 and contacts 34. The pulses produced indicate the mid-points of the breathing cycles. These pulses are applied to a relay in the synchronizer which is used to initiate a ramp function. The mid-point of the ramp function is to be the correct time for the first heart sound. An audio tape 35 which contains the heart sounds also contains synchronization information 36a, 36b in the form of either pieces of foil as illustrated, or 5 KHz subcarrier pulses which are located 5 seconds apart and correspond to the first heart sound. The five heart sounds 37a–37e on each track occur within one 5- second breathing cycle. The synchronization information is read by a signal sensor 38 which is coupled to the synchronizer 31 to cause a relay to close momentarily in the synchronizer to sample the initiated ramp function. This produces a measurement in terms of voltage as to whether the audio sound is early or late with respect to the mechanical simulation system. This sample is held until the next sample comes along. The sample is applied to a voltage controlled oscillator whose frequency is nominally 60 Hz at a voltage corresponding to that of the midpoint of the ramp. If the sound is late, the voltage controlled oscillator in the synchronizer 31 is proportionally increased and if it is early, it is proportionally decreased. Therefore, after a few samples it is in time and continues to run on time at a nominal 60 Hz frequency. The heart sounds follow the speed of the voltage controlled oscillator because its output signal is now coupled through a power amplifier 39, for example a Bogen type CHB100, to drive and control the synchronous motor drive 40 of the tape player.

The synchronizer system 31 parameters permit rapid synchronization. The time required for synchronization is random because the start of the tape player is random and synchronization can take any amount of time from zero to about 25 seconds. Because an endless tape is used, containing an integral multiple of five seconds of length, synchronization need take place only once each time a disease is changed. Changing of a tape may occur by either replacing a particular tape which may be in the form of cassettes, or by erasing the tape and rewriting according to a system such as described in the cross referenced application. The acquisition time described above will in most instances synchronize a new tape before the mechanical system has completed its change to the new selected illness.

Referring now to FIG. 3, a detailed schematic diagram illustrates a synchronizer according to the invention. The coil of relay K1 is connected to the manikin timing as illustrated in FIG. 2. Its contacts are momentarily closed according to the breathing cycle established. This causes capacitor C1 to charge and discharge producing a ramp function according to the time constant established by capacitor C1 and resistor R1. An amplifier A1 is connected as a voltage follower with its labeled points connected as illustrated to produce at its output point A6 a ramp voltage, the reference of the ramp voltage being variable according to the point set on the variable resistor R2. This set point has been preset to the linear portion of the following COSMOS element B1. The ramp function is sampled according to the tape timing synchronization which momentarily closes the contacts of relay K2. Capacitor C2 stores the voltage sampled, since the time constant provided by C2 and the COSMOS element B1 is long due to the high impedance of the COSMOS device which is connected as illustrated. Resistor R4 couples the sampled and stored voltage to the amplifier D1 which is connected as an inverting DC buffer and summer. The mid-point of the ramp function has been set by adjusting the resistive arrangement of R4, R5 and R6. Resistor R7 has the same value as R5 to provide a one-to-one gain ratio, so that the synchronizing arrangement does not overshoot during operation. The voltage at point D6 controls the bias on the FET which is coupled by C3 to the following voltage controlled oscillator arrangement. The VCO arrangement includes amplifier E1 and a limiter portion comprising two zener diodes Z1, Z2 and three resistors R8, R9 and R10 connected as illustrated. The time constant for the oscillator output is determined by C4 and the FET which are coupled in parallel with C5 and R12. The VCO nominally produces for the parmeters indicated a 60 Hz output. According to the bias applied from output D6, the FET resistance will vary, and the oscillator frequency output will change in proportion to the resistance variation caused by the biasing voltage.

The illustrated circuit of FIG. 3 will function as follows. When the contacts of relay K1 close, C1 will charge to produce the ramp function. Assume that the contacts of relay K2 close too soon before the desired synchronization, i.e. a synchronizing point on the tape is detected and K1 momentarily closes. This means that the output voltage at A6 is lower than the mid-point of the ramp, and the sampled and stored voltage across C2 is lower than normal. Then the voltage at B12 is inverted and higher than normal. This voltage is again inverted and summing, and the bias output voltage at D6 is lower than normal. A lower bias voltage will provide a higher resistance, and the total time constant of the VCO is increased. The longer time constant will cause a lowering of the frequency. In a similar manner, on the next cycle the sampling of the ramp function will be closer to the preset midpoint, and will continue until both the manikin breathing timing cycle and the audio tape cycle are in synchronism. As previously indicated, since the start of the tape recorder is random, synchronism with the components illustrated can take any amount of time from 0 to 25 seconds.

In the foregoing a means has been described for synchronizing a selected sound cycle with the mechanical motion cycle of a manikin. The synchronizer includes a means for producing a first function indicating a mechanical timing cycle, a second means coupled to said first means for storing a sample of said first function in response to a selected sound cycle, and means to provide a voltage output proportional to cause a voltage variable means to control a subsequently coupled voltage controlled oscillator, whereby the output of said oscillator is proportional to the synchronization required between sound and mechanical cycles.

Although I have described above the principles of my invention in connection with specific apparatus, it

I claim:

1. A manikin arrangement comprising:
   means for providing an indication of a mechanical motion cycle of said manikin;
   means for selectively producing one of a plurality of audio sounds;
   means for producing an indication of a selected audio cycle; and
   means for synchronizing the selected audio cycle with said mechanical motion cycle, further comprising
   a. first means for producing a ramp function voltage representing said mechanical motion cycle including
      a relay having its contacts momentarily closed according to said cycle,
   b. second means coupled to said first means for storing and sampling said ramp voltage in response to said audio cycle including
      a second relay having its contacts momentarily closed according to said cycle for sampling said ramp voltage,
   c. third means coupled to said second means to provide a voltage output proportional to the stored voltage, and
   d. Fourth means coupled to said third means to effect a synchronization between said mechanical and audio cycles.

2. A synchronization system for a manikin comprising:
   first means responsive to a first cycle indicating a breathing cycle to produce a first function including
   a. a relay having its contacts momentarily closed according to said first cycle,
      a first capacitor and resistor coupled to said relay contacts, said first capacitor charging and discharging to produce a ramp function determined by the time constant of said first capacitor and resistor and the closing of said relay contacts, and
      a voltage follower amplifier coupled to receive said ramp function and produce at its output a ramp voltage;
   second means responsive to a second cycle indicating a cycle of heartbeats to store a sample of said first function including
   b. a second relay having its contacts momentarily closed according to said second cycle for sampling said ramp voltage,
      a second capacitor coupled to said relay contacts and across a high impedance element to store the voltage sampled, and
      a variable resistor coupled between the output of said follower amplifier and said second relay contacts, said variable resistor being used to adjust the reference level of said ramp voltage;
   third means responsive to said stored sample to produce a signal proportional thereto, including
   c. a third amplifier and resistive means connected as an inverting DC buffer and summer stage to provide at the amplifier output said proportional voltage; and
   means responsive to said proportional signal causes said heartbeat cycle to be brought into predetermined synchronism with said breathing cycle.

* * * * *